Sept. 20, 1960  A. D. GARRISON  2,953,686

DETECTOR OF PENETRATIVE RADIATION

Filed Sept. 15, 1954

2,953,686
DETECTOR OF PENETRATIVE RADIATION

Allen D. Garrison, Houston, Tex., assignor to Texaco Development Corporation, New York, N.Y., a corporation of Delaware Filed Sept. 15, 1954, Ser. No. 456,153

10 Claims. (Cl. 250—83.3)

This invention relates to a method and an apparatus for measuring radiation and is a continuation-in-part of our pending application Serial No. 308,895, filed September 10, 1952, now abandoned.

An often preferred way of detecting penetrative radiation is by converting it into scintillations and then detecting one or more characteristics of the scintillations, such as their amplitudes and/or occurrence rates. While this in general is very satisfactory, the scintillations often are quite weak. Because of this: (1) they are difficult to detect reliably and to measure accurately; and (2) they can only be detected by very high gain photoelectric devices which, thus far in the prior art, have been secondary-emission electron-multiplier tubes which are prone to be very sensitive to power supply variations, to have poor signal-to-noise ratios in high temperature ambients, and to lack uniformity even as between seemingly identical tubes.

Accordingly, it is an object of the present invention to devise, for kinds of detection apparatus in which light is detected in order to detect penetrative radiation, such improvements that light which is to be representative of radiation can be much more intense than the light usually afforded by scintillations.

This and other objects are attained according to the present invention by using, as the active head of the detector, not an element which responds to radiation to generate light, i.e., a luminophor, but one which responds thereto to control the transmission of light from a separate source thereof to the light detector, i.e., a radiation-actuated "light valve." In an illustrative embodiment disclosed herein the "valve" is a continuously sensitive cloud chamber which, by scattering light, can couple it from a source thereof to a detector thereof, upon which light from the source is not normally directed, and can do so substantially in proportion to the number of vapor trails which at any instant are present in the chamber as a result of irradiation thereof.

Figure 1:
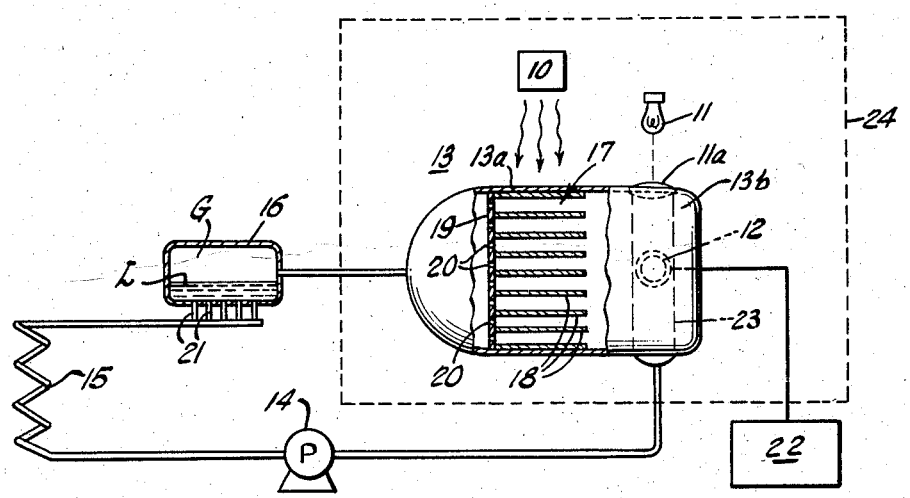
Fig. 1 is a schematic representation of one embodiment of the invention.
Figure 2:
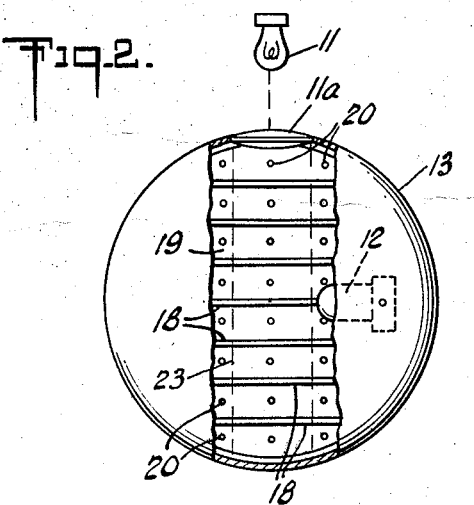
Fig. 2 is an end view, partly cut away, of the cloud chamber.

The showing of Fig. 1 includes a source 10 of the penetrative radiation which is to be measured and apparatus responsive to radiation from this source to control the transmission of light from a light source, 11, to a light detector, 12, the "control apparatus" comprising all of the elements shown in Fig. 1 other than the sources 10 and 11 and the detector 12. More particularly the apparatus comprises a cloud chamber 13 comprising an expansion portion 13a and an illuminating portion 13b connected in series with a pump 14, a cooling coil 15, and a saturator 16 which, operating on much the same principle as a mechanical refrigerating system, are effective to render the cloud chamber continuously sensitive. The cloud chamber 13, in the particular example shown herein, is adapted to have high sensitivity for electromagnetic-wave types of penetrative radiation, e.g., gamma rays and X-rays, as well as for high energy charged particles. To this end it contains an array 17 of planar, spaced-apart interaction-elements or fins 18, preferably of a heavy metal, for converting penetrative electromagnetic wave radiation into charged-particle by-products. As is known in the prior art (see U.S. Patents Nos. 2,397,073 and 2,397,071 and copending application Serial No. 284,615, filed April 26, 1952, and issued on October 10, 1956, as U.S. Patent No. 2,741,709), this type of array constitutes a means for converting highly penetrative electromagnetic wave radiation into less penetrative charged particles with excellent efficiency due to the fact that it affords the electromagnetic waves long paths through dense material and thus good probabilities of sustaining interactions while at the same time it affords any charged-particle by-products of interactions easy escapes from the sides of the elements. Thus the elements of the array 17 may be thin plates of a heavy metal which absorb gamma rays to eject Compton electrons and cause ions and activated molecules to appear in the cloud chamber gas. As a matter of fact the array 17 can be made to have an even higher efficiency than corresponding multiple-plate cathode arrays for Geiger-Mueller tubes, since there is no need that any charged-particle collecting field penetrate deeply into its inter-element spaces and since therefore these spaces may be smaller than those in such cathode arrays.

The closed system comprising the cloud chamber 13 and the elements connected in series therewith is charged with a mixture of a gas, G, such as helium or air, and vapor of a vaporizable liquid, L, such as water or alcohol. To this end a sufficiently large pool of the liquid is placed in the sump of the saturator 16 to sustain saturation and supersaturation of the gas in respective portions of the system as more fully explained below. As is customary in mechanical refrigerating systems a constriction is provided in series with the closed system so that at the end of a high pressure portion thereof, in which it is maintained under pressure by a force pump, the circulating fluid will undergo a pressure drop as it enters into a low-pressure portion, and will therefore sustain a drop in temperature. In the present apparatus the array 17 provides the required constriction by having its top, bottom and side peripheries hermetically sealed to the adjacent surfaces of the inside walls of the cloud chamber 13, so that the vapor-bearing gas charge can only move through the array by passing through its inter-element spaces, and each of these spaces is made small enough so that the combined effect of all of them is still that of a constricting element. If the spacings cannot be made this small without so reducing the average length of the paths of flight of escaped charged particles within the array that they will be incapable of producing sufficient numbers of ions, then the spacings may be made as large as needed for ion production and an end of the array may be covered over with a diaphragm 19 having a plurality of slits or holes 20 which are in respective alignment with the inter-element spacings and are small enough to act together as a constricting means.

In the operation of the apparatus shown in Fig. 1 the pump 14 will maintain a pressure differential between the portions of the system lying respectively between its input (right) and output (left) sides and the apertured diaphragm 19 whereby the vapor-bearing charge will continuously expand through the slits or holes 20 into the expansion 13a of the cloud chamber 13 causing the space therein to be at a substantially lower temperature than that in any other part of the system. Some of the heat which will be developed in the charge while it is being compressed by the pump 14 will be dissipated from the cooling coils 15 into any suitable coolant medium such as the surrounding air. After leaving the cooling coils the charge will enter the saturator 16 by passing through a plurality of tiny orifices 21 in the bottom of its sump and bubbling up through the pool of liquid, and it thereby will become saturated with vapor of the liquid. When the charge thereafter moves through the array 17 its constituent atoms and/or molecules will be bombarded by charged-particle by-products escaping from the surfaces of the elements 18 and some of them will thereby be converted into ions. As the charge moves rightward in the system into the cool or illuminating portion 13b of the cloud chamber it will carry these ions with it. By proper design of the system in accordance with known principles and by maintaining an adequate pressure differential on the opposite sides of the diaphragm 19, the change in temperature sustained by the charge when it passes through the diaphragm holes 20 will cool it to below the dew point of the vapor with which it is saturated. As a result particles of the vapor will condense onto the ionized atoms and/or molecules to form droplets which will move through the system toward the pump at the rate of circulation of the entire charge. As the droplets pass through the beam of light 23 provided by the light source 11 and entering the chamber 13 through the lens 11a, they will cause some of the rays of the beam to be scattered in such directions as to fall upon the cathode of photoelectric device 12. The photoelectric device 12 is disposed so that its cathode will be outside of the light beam 23 and preferably positioned so as to receive light from the beam at substantially 90° thereto. In certain ranges of operation the degree of light scattering, and therefore of coupling of light from the source 11 to the device 12, will increase in proportion to the number of droplets instantaneously present in the beam and therefore in proportion to both the instantaneous intensity of ionization and of the penetrative radiation which produces it. The output of the photoelectric device 12 may be connected to any appropriate utilization device 22, such as a means for indicating and/or recording information such as an electrical pulse count or occurrence rate or a flux density in roentgens per second.

Attention is called to the fact that the "dark current" drawn by the photoelectric device 12 may be very low in this arrangement since the collimated beam of light is not directed onto the device and therefore will not excite it except for any very few rays which may be spuriously scattered. The entire cloud chamber 13 plus the light source 11 and the photoelectric device 12 may be surrounded by an enclosure 24 which is opaque to external ambient light and which may have blackened interior walls so that a minimum of light will be scattered from the source 11 to the device 12 in any other way than by condensed vapor. It is further noted that since the source 11 may provide light of very great intensity as compared to that of the ambient heat which it is expected to encounter in the intended use of the apparatus, and since therefore the scattered portion of this light may also be relatively intense, the signal-to-noise ratio can be maintained at a very high value despite the spurious thermal emission which unavoidably occurs from the cathodes of the photoelectric devices.

Inasmuch as the light which is scattered to the photoelectric device 12 may be relatively intense as compared, for example, to scintillations produced in luminophors, it will be possible in some embodiments for this device to be of some very simple type, as distinguished from a photoelectron multiplier tube, e.g., a photoelectric diode, a photosensitive semi-conductor cell ("transistor"), or even a photovoltaic cell, whose output, if need be, can easily be amplified by a conventional electronic amplifier. In this way it will be possible to avoid the use of the high voltage power supply required for photoelectron multiplier tubes as well as the instabilities and disadvantages sometimes occasioned by the use of such tubes. However, it is to be understood that where the scattered light is expected to be of low intensity, it will be entirely possible to use photoelectron multiplier types of tubes for detecting it.

While the cloud chamber 13 shown herein is particularly adapted to the detection of gamma rays, due to the inclusion in it of the array 17, it is to be understood that it is not an essential feature of the present invention that it be thus adapted. Instead its structure may be varied at will, in accordance with known practices and to make it suitable for the detection of other kinds of radiation, by rendering it responsive to that radiation to provide within the ionizable filling of the chamber energy-charged particles which are derived therefrom. For example, it can be made responsive to neutrons by coating at least a portion of its interior surface with a neutron reactive substance such as boron or lithium, which is capable of responding to neutrons to project charged particles, i.e., alpha particles, into the ionizable filling, or it can be made responsive to radiation which initially comprises charged particles, such as alpha and beta radiation, by providing it with a thin enough window to permit their entry into the chamber. Of course, the chamber 13, even as it is embodied in the drawing will be responsive to those charged particles initially comprised in some types of radiation, e.g., cosmic radiation, which are sufficiently penetrative to pass through the chamber walls even though they are not provided with a thin window.

From the foregoing it will be seen that a method and apparatus have been provided for the measurement of penetrative radiation and which involve the operation of a continuous cloud chamber expansion. Thus, a continuous stream of cloud particles is produced whose particle number increases with increasing intensity of the radiation being measured. A photosensitive device at substantially right angles to a beam of light in the chamber serves to record the light reflected from the cloud particles and therefore the intensity of the radiation.

Obviously many modifications and variations of the invention, as hereinbefore set forth, may be made without departing from the spirit and scope thereof, and therefore only such limitations should be imposed as are indicated in the appended claims.

I claim:

1. Apparatus for detecting penetrative radiation comprising a cloud chamber, means for continuously circulating a gaseous vapor through said chamber, at least one metal plate within said chamber and disposed so that the circulating gaseous vapor moves past and in contact therewith, means for directing a beam of light through the vapor after it has passed said plate and a photoelectric light-detecting device disposed near said beam, the arrangement being such that penetrative radiation in striking said plate causes electrons to be ejected therefrom to produce ions in said vapor, liquid particles from said vapor collecting upon said ions and serving to scatter some of said light to said light-detecting device, the amount of light so scattered depending upon the intensity of the penetrative radiation.

2. Apparatus for detecting penetrative radiation comprising a cloud chamber, means for continuously circulating a gaseous vapor through said chamber, a plurality of spaced, substantially parallel, metal plates within said chamber and disposed so that the circulating gaseous vapor passes through the spaces between said plates, means for directing a beam of light through the vapor issuing from the spaces between said plates, and photoelectric light-detecting means disposed near said beam, the arrangement being such that penetrative radiation in striking said plates causes electrons to be ejected therefrom to produce ions in said vapor, liquid particles from said vapor collecting upon said ions and serving to scatter some of said light to said light-detecting means, the amount of light so scattered depending upon the intensity of the penetrative radiation.

3. Apparatus comprising a cloud chamber including an illuminating portion and a portion adjacent thereto containing an array of spaced-apart interaction elements for converting photons of electromagnetic-wave penetrative radiation into energy-charged particles, a vapor-including ionizable filling, means for continuously supersaturating said filling with said vapor, means for continuously flowing said filling through the spaces between the elements of said array and into the illuminating portion, means for projecting light into said illuminating portion to cause scattering thereof by agglomerations of condensed vapor therein, and light-detecting means positioned to receive light from said source which will vary in intensity in accordance with variations in the scattering thereof by said agglomerations.

4. Apparatus as in claim 3 in which the means for continuously supersaturating said filling comprises constricting means resisting the free flow of said filling into the illuminating portion from the side of the array farthest therefrom.

5. Apparatus as in claim 3 in which said flowing means includes a pump, said chamber is connected in series with the pump over an hermetically sealed system for recycling said ionizable filling through the chamber, said means for continuously supersaturating said filling includes means for raising the vapor content of said filling located between said pump and the chamber, and said pump is adapted to maintain a sufficient pressure differential between the illuminating portion and the rest of the system to cause said filling within the chamber to be supersaturated with vapor.

6. A continuous cloud chamber radiation detection apparatus for continuously measuring the intensity of an ionizing radiation which comprises a detection chamber comprising means including an expansion orifice for continuously introducing a gaseous medium supersaturated with a vapor material into said chamber, said chamber including a detection zone adapted to have ionizing radiation introduced therein for measurement whereby vapor particles of the saturated medium tend to condense onto condensation nuclei in said medium, means for continuously measuring the quantity of condensed vapor particles in said medium as it passes through the chamber, means for continuously withdrawing the gaseous medium including condensed vapor particles from said chamber.

7. A continuous cloud chamber radiation detection apparatus for continuously measuring the intensity of an ionizing radiation which comprises a detection chamber including means for continuously introducing a gaseous medium supersaturated with a vapor material into said chamber, said chamber including a detection zone adapted to have ionizing radiation introduced therein for measurement whereby vapor particles of the supersaturated medium tend to condense onto condensation nuclei in said medium, means for continuously measuring the quantity of condensed vapor particles in said medium, means for continuously withdrawing the gaseous medium including condensed vapor particles from said chamber, means including a closed return path for recirculating the medium withdrawn from said chamber, said recirculating means including means for returning said medium to said chamber supersaturated with said vapor for continuous operation of the detection apparatus.

8. A continuous cloud chamber radiation detection apparatus for continuously measuring the intensity of an ionizing radiation which comprises a detection chamber comprising means including an expansion orifice for continuously introducing a gaseous medium supersaturated with a vapor material into said chamber, said chamber including a detection zone adapted to have ionizing radiation introduced therein for measurement whereby vapor particles of the saturated medium tend to condense onto condensation nuclei in said medium, means for continuously measuring the quantity of condensed vapor particles in said medium, means for continuously withdrawing the gaseous medium including condensed vapor particles from said chamber, means including a closed return path for recirculating the medium withdrawn from said chamber, said recirculating means including means for resaturating said medium with vapor and returning it through said expansion orifice to said chamber for continuous operation.

9. A continuous cloud chamber radiation detection apparatus for continuously measuring the intensity of an ionizing radiation which comprises a detection chamber comprising means including an expansion orifice for continuously introducing a gaseous medium supersaturated with a vapor material into said chamber, said chamber including a detection zone adapted to have ionizing radiation introduced therein for measurement whereby vapor particles of the saturated medium tend to condense onto condensation nuclei in said medium, means including a light source and a photosensitive detector for continuously measuring the intensity of light rays resulting from the source as affected by said condensed vapor particles in said medium passing thereby as an indication of the intensity of the ionizing radiation introduced into said chamber, means for continuously withdrawing the gaseous medium including condensed vapor particles from said chamber, means including a closed return path for recirculating the medium withdrawn from said chamber, said recirculating means including means for resaturating said medium with vapor and returning it through said expansion orifice to said chamber for continuous operation.

10. A continuous cloud chamber radiation detection apparatus for continuously measuring the intensity of an ionizing radiation which comprises a detection chamber comprising means including an expansion orifice for continuously introducing a gaseous medium supersaturated with a vapor material into said chamber, said chamber including a detection zone adapted to have ionizing radiation introduced therein for measurement whereby vapor particles of the saturated medium tend to condense onto condensation nuclei in said medium, means for continuously measuring the quantity of condensed vapor particles in said medium, means defining a closed return path including a pump for continuously withdrawing the gaseous medium including condensed vapor particles from said chamber and for recirculating the medium withdrawn from said chamber and returning it through said expansion orifice to said chamber for continuous operation, said return path including means for cooling said medium after passing through said pump and means for saturating said medium with said vapor after being subjected to said cooling means.

References Cited in the file of this patent

UNITED STATES PATENTS

| | | |
|---|---|---|
| 1,707,141 | Rudenberg | Mar. 26, 1929 |
| 2,397,071 | Hare | Mar. 19, 1946 |
| 2,418,523 | Neddermeyer et al. | Apr. 8, 1947 |

OTHER REFERENCES

Sourcebook of Atomic Energy, by Glasstone, published by D. Van Nostrand Company, Inc., New York, in 1950, pages 142 to 148.